US012230864B2

(12) United States Patent
Tsuchiya

(10) Patent No.: US 12,230,864 B2
(45) Date of Patent: Feb. 18, 2025

(54) WIRELESS APPARATUS

(71) Applicant: NEC Platforms, Ltd., Kawasaki (JP)

(72) Inventor: Masato Tsuchiya, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 314 days.

(21) Appl. No.: 17/625,867

(22) PCT Filed: Jun. 15, 2020

(86) PCT No.: PCT/JP2020/023345
§ 371 (c)(1),
(2) Date: Jun. 22, 2022

(87) PCT Pub. No.: WO2021/014819
PCT Pub. Date: Jan. 28, 2021

(65) Prior Publication Data

US 2022/0368006 A1 Nov. 17, 2022

(30) Foreign Application Priority Data

Jul. 25, 2019 (JP) ................................ 2019-136946

(51) Int. Cl.
*H01Q 1/22* (2006.01)
*H01Q 1/24* (2006.01)
*H01Q 1/48* (2006.01)

(52) U.S. Cl.
CPC ................. *H01Q 1/24* (2013.01); *H01Q 1/48* (2013.01)

(58) Field of Classification Search
CPC .. H01Q 1/24; H01Q 1/48; H01Q 9/30; H01Q 1/243; H01Q 1/22
See application file for complete search history.

(56) References Cited

U.S. PATENT DOCUMENTS 4,611,214 A * 9/1986 Campbell .............. H01Q 19/22 343/834
4,658,266 A * 4/1987 Doty, Jr. .................. H01Q 9/38 343/846
(Continued)

FOREIGN PATENT DOCUMENTS

CN 217182415 U * 8/2022 ............ H01Q 1/242
JP 2008-160314 A 7/2008
(Continued)

OTHER PUBLICATIONS

International Search Report for PCT Application No. PCT/JP2020/023345, mailed on Sep. 1, 2020.

*Primary Examiner* — Hai V Tran
*Assistant Examiner* — Bamidele A Immanuel

(57) ABSTRACT

There is provided a wireless apparatus with which a communication range may be prevented from being reduced even in a case where the height of the apparatus is restricted. The wireless apparatus includes an antenna device configured by a substrate including a substrate ground and an antenna element provided on the substrate, and a conductor formed into a sideways U-shape. The conductor includes an upper section and a lower section that are disposed along a ground plane and vertically relative to each other, and a middle section that is disposed substantially perpendicular to the ground plane, between one end of the upper section and one end of the lower section. The conductor is disposed such that the upper section, the lower section, and the middle section thereof are near an upper side section, a lower side section, and a lateral side section of the antenna device, respectively. The upper section of the conductor is disposed near the antenna element, and the conductor functions as an antenna due to current being excited in the conductor when power is supplied to the antenna element.

4 Claims, 22 Drawing Sheets

(56) References Cited

U.S. PATENT DOCUMENTS

| | | | | |
|---|---|---|---|---|
| 10,205,232 | B2 * | 2/2019 | Sayama | H01Q 1/52 |
| 2004/0021608 | A1 * | 2/2004 | Kojima | H01Q 19/005 343/702 |
| 2004/0130492 | A1 * | 7/2004 | Egawa | H01Q 19/32 343/702 |
| 2006/0017624 | A1 * | 1/2006 | Nagano | H01Q 19/30 343/702 |
| 2008/0150810 | A1 * | 6/2008 | Sugiyama | H01Q 9/40 343/702 |
| 2008/0300028 | A1 * | 12/2008 | Uejima | H01Q 1/243 455/575.3 |
| 2009/0233657 | A1 * | 9/2009 | Ogawa | H01Q 9/16 455/575.3 |
| 2010/0171590 | A1 * | 7/2010 | Perkins, III | H01Q 21/29 343/797 |
| 2011/0248895 | A1 * | 10/2011 | Bungo | H01Q 9/42 343/702 |
| 2013/0162484 | A1 | 6/2013 | Shimizu | |
| 2014/0111399 | A1 * | 4/2014 | Lin | H01Q 1/36 343/843 |
| 2014/0232606 | A1 * | 8/2014 | Niver | H01Q 9/285 343/807 |
| 2017/0005396 | A1 * | 1/2017 | Aoki | H01Q 19/22 |
| 2017/0125880 | A1 * | 5/2017 | Ban | H01Q 1/38 |
| 2017/0187090 | A1 * | 6/2017 | Niwano | H01Q 1/1271 |
| 2018/0123218 | A1 * | 5/2018 | Bellec | H01Q 1/04 |
| 2018/0183135 | A1 * | 6/2018 | Suzuki | H02J 7/00 |
| 2019/0207295 | A1 * | 7/2019 | Miura | H01Q 1/00 |
| 2019/0214725 | A1 * | 7/2019 | Koga | H01Q 5/371 |
| 2019/0312341 | A1 | 10/2019 | Tonoe et al. | |
| 2022/0181777 | A1 * | 6/2022 | Reitner | H01Q 1/48 |

FOREIGN PATENT DOCUMENTS

| | | | | |
|---|---|---|---|---|
| JP | 2012095121 | A * | 5/2012 | H01Q 1/24 |
| JP | 2013-131901 | A | 7/2013 | |
| JP | 2017-092536 | A | 5/2017 | |
| WO | WO-2006011254 | A1 * | 2/2006 | H01Q 1/242 |
| WO | 2017/204132 | A1 | 11/2017 | |
| WO | 2018/190011 | A1 | 10/2018 | |

* cited by examiner

WIRELESS APPARATUS

This application is a National Stage Entry of PCT/JP2020/023345 filed on Jun. 15, 2020, which claims priority from Japanese Patent Application 2019-136946 filed on Jul. 25, 2019, the contents of all of which are incorporated herein by reference, in their entirety.

TECHNICAL FIELD

The present invention relates to a wireless apparatus.

BACKGROUND ART

Patent Literature 1 discloses an installation body that is positioned near an antenna. The installation body according to Patent Literature 1 includes a conductor that is positioned near an antenna of a transmitter in a state where the transmitter is adjacent. An induced current is generated in the conductor by a drive current of the antenna, and the induced current has a current component in a direction different from the direction of the drive current.

Furthermore, Patent Literature 2 discloses a wireless apparatus including an antenna device for horizontal polarization. The antenna device for horizontal polarization includes a radiation conductor including two conductive plates obtained by bending, a ground conductor, and a feeding element, the two conductive plates being disposed facing each other across a predetermined gap, the radiation conductor being formed, as a whole, into a cylindrical shape extending in a vertical direction. The ground conductor is disposed in an inner space surrounded by the two conductive plates of the radiation conductor and is electrically grounded. The feeding element is disposed in the inner space, along inner walls of the conductive plates in a top view, and operates as a reverse L antenna when power is fed between one end portion thereof and the ground conductor, and feeds power to the radiation conductor by electromagnetic coupling.

CITATION LIST

Patent Literature

Patent Literature 1: International Patent Publication No. 2017/204132

Patent Literature 2: Japanese Unexamined Patent Application Publication No. 2013-131901

SUMMARY OF INVENTION

Technical Problem

To perform transmission/reception of radio waves between wireless apparatuses, polarizations of antennas have to be matched. Accordingly, in the case where the polarization of the antenna of a counterpart apparatus is only vertical polarization, the antenna of the subject apparatus needs to have vertical polarization. Here, generally, to achieve vertical polarization, a component, of the antenna device, perpendicular to a ground plane needs to have a certain length, and to increase the vertical polarization, the height of the apparatus has to be increased. However, the height of the apparatus is often restricted by installation conditions and the like of the apparatus, and in such a case, the vertical polarization possibly becomes small. This may result in a problem of a reduced communication range. The technologies according to Patent Literatures described above may not solve the problem described above.

An object of the present disclosure is to solve the problem as described above, and to provide a wireless apparatus with which a communication range may be prevented from being reduced even in a case where the height of the apparatus is restricted.

Solution to Problem

A wireless apparatus according to the present disclosure includes: an antenna device configured by a substrate including a substrate ground and an antenna element provided on the substrate; and a conductor formed into a sideways U-shape, in which the conductor includes an upper section and a lower section that are disposed along a ground plane and vertically relative to each other, and a middle section that is disposed substantially perpendicular to the ground plane, between one end of the upper section and one end of the lower section, the conductor is disposed such that the upper section, the lower section, and the middle section thereof are near an upper side section, a lower side section, and a lateral side section of the antenna device, respectively, and the upper section of the conductor is disposed near the antenna element, and the conductor functions as an antenna due to current being excited in the conductor when power is supplied to the antenna element.

Advantageous Effects of Invention

According to the present disclosure, there may be provided a wireless apparatus with which a communication range may be prevented from being reduced even in a case where the height of the apparatus is restricted.

DESCRIPTION OF EMBODIMENTS (Outline of Example Embodiments of Present Disclosure)

Before describing example embodiments of the present disclosure, an outline of the example embodiments of the present disclosure will be given. First, polarization of an antenna will be described.

Polarization is one of antenna characteristics. A case where an electrical field is confined to one plane is referred to as linear polarization. Furthermore, of the linear polarization, a case where the electrical field is parallel to a ground plane is referred to as horizontal polarization, and a case where the electrical field is perpendicular to the ground plane is referred to as vertical polarization.

For example, polarization of an antenna is horizontal polarization when an antenna device is disposed parallel to the ground plane. When the antenna device is perpendicularly disposed relative to the ground plane, the polarization of the antenna is vertical polarization.

Figure 1:
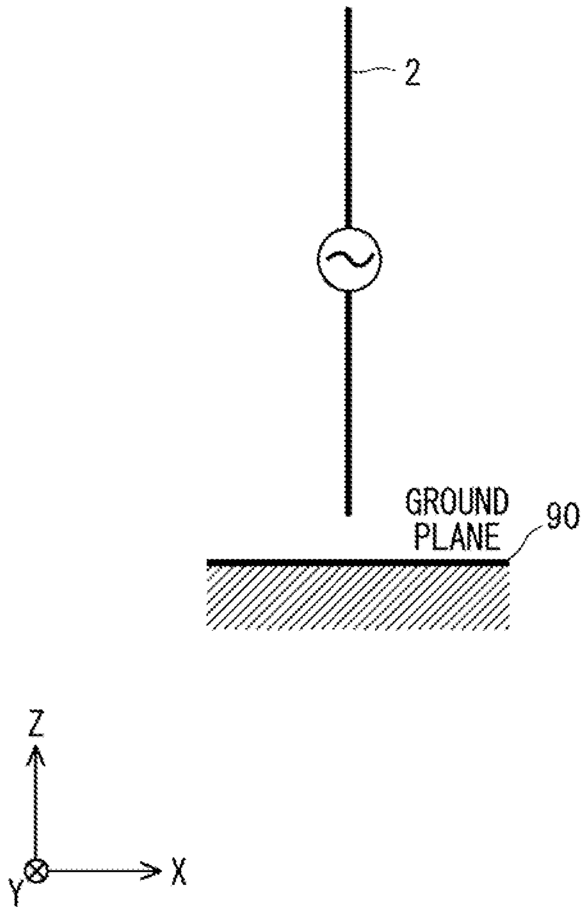
FIG. 1 is a diagram for describing a case where an antenna is a dipole antenna.
Figure 2:
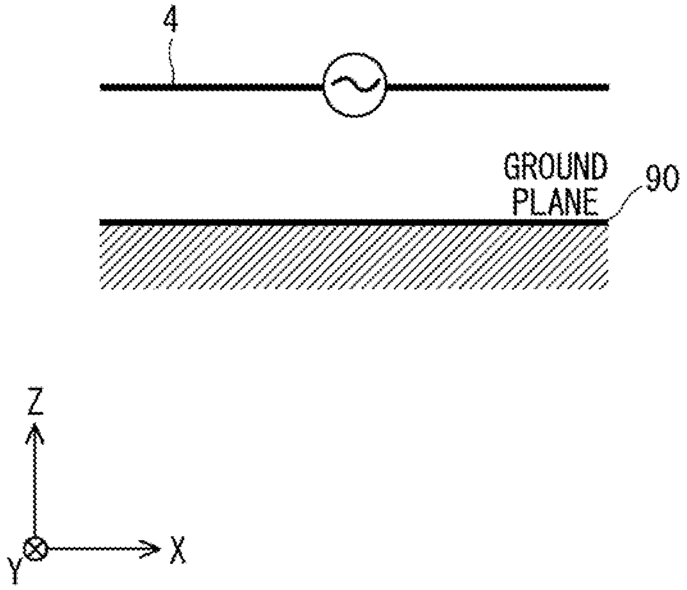
FIG. 2 is a diagram for describing a case where an antenna is a dipole antenna.
Figure 3:
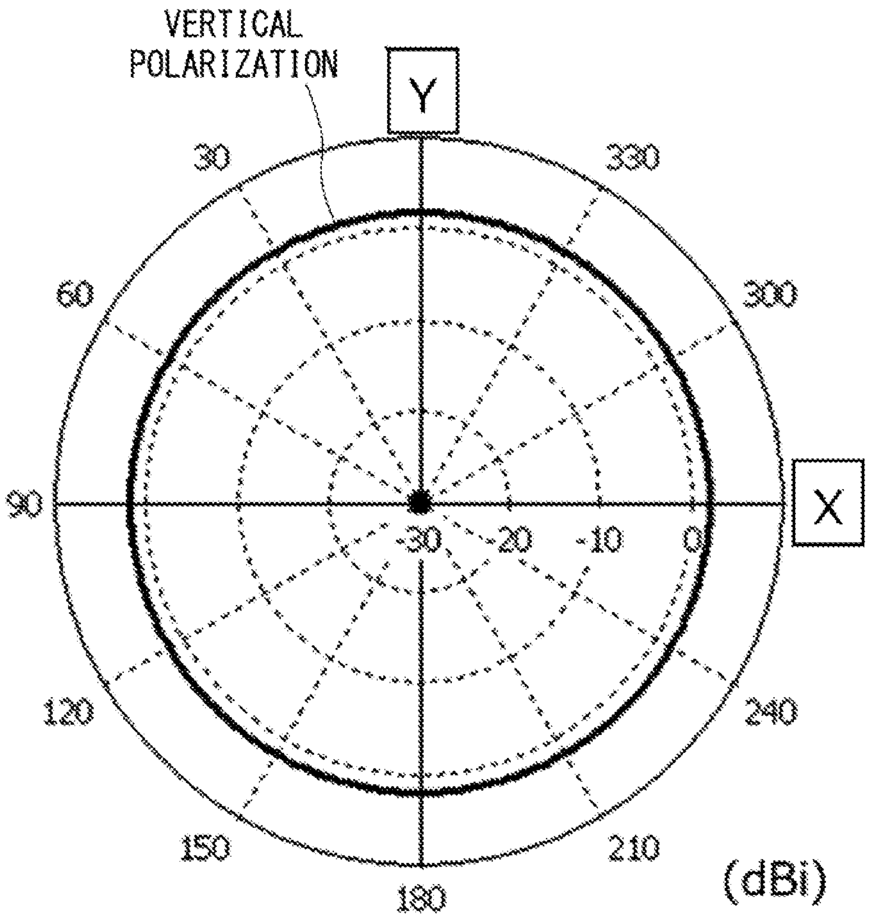
FIG. 3 is a diagram for describing a case where an antenna is a dipole antenna.
Figure 4:
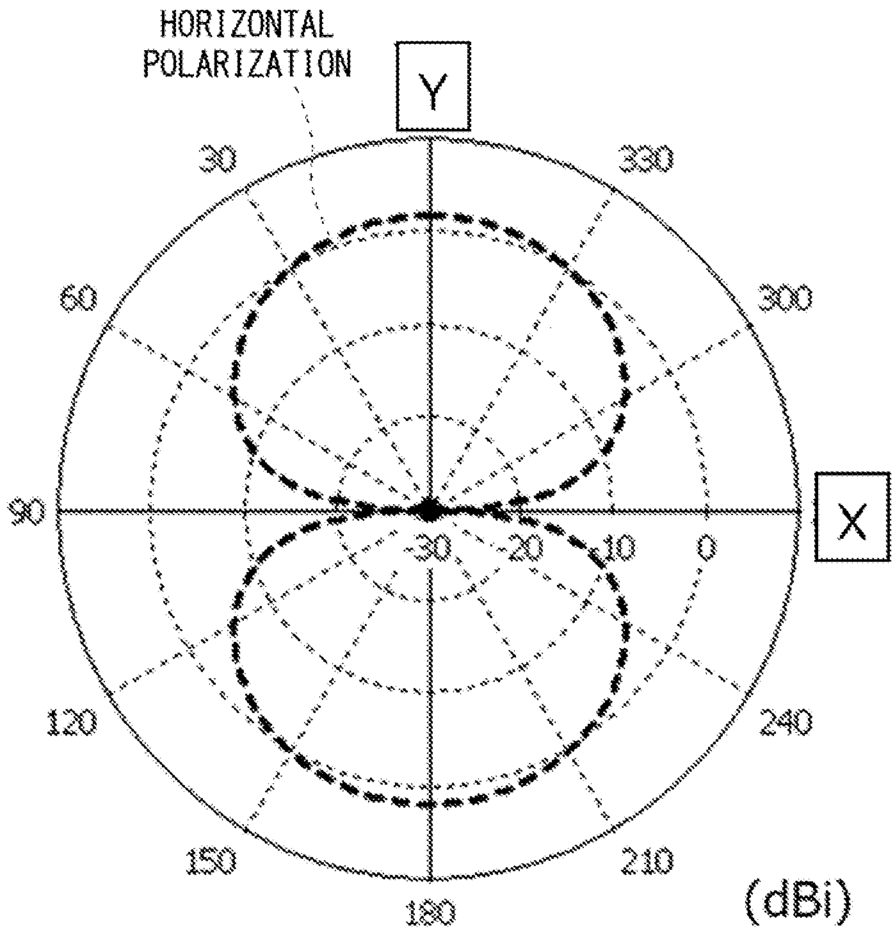
FIG. 4 is a diagram for describing a case where an antenna is a dipole antenna.

FIGS. 1 to 4 are diagrams for describing cases where an antenna is a dipole antenna. FIG. 1 shows a dipole antenna 2 that is disposed perpendicular to a ground plane 90. FIG. 2 shows a dipole antenna 4 that is disposed parallel to the ground plane 90. FIG. 3 is a diagram showing an example of a radiation pattern, in a ground plane direction (on an XY plane), of the dipole antenna 2 shown in FIG. 1. FIG. 4 is a diagram showing an example of a radiation pattern, in the ground plane direction (on the XY plane), of the dipole antenna 4 shown in FIG. 2. Additionally, the ground plane direction refers to a plane along the ground plane 90.

In FIG. 3, the radiation pattern for vertical polarization is indicated by a thick solid line (the same applies to the radiation patterns in other drawings). Furthermore, in FIG. 4, the radiation pattern for horizontal polarization is indicated by a thick dashed line (the same applies to the radiation patterns in other drawings). As shown in FIG. 3, in the case of a pure dipole antenna, polarization of the dipole antenna 2 disposed perpendicular to the ground plane 90 is only vertical polarization. Furthermore, as shown in FIG. 4, polarization of the dipole antenna 2 disposed parallel to the ground plane 90 is only horizontal polarization. Additionally, a resonance frequency of the antenna according to the present disclosure is 900 MHz. Accordingly, the radiation patterns shown in FIGS. 3 and 4 each show a result for a case where the resonance frequency of the antenna is 900 MHz. Additionally, the resonance frequency of the antenna is not limited to 900 MHz.

Next, comparative examples against the example embodiments of the present disclosure will be described.

Figure 5:
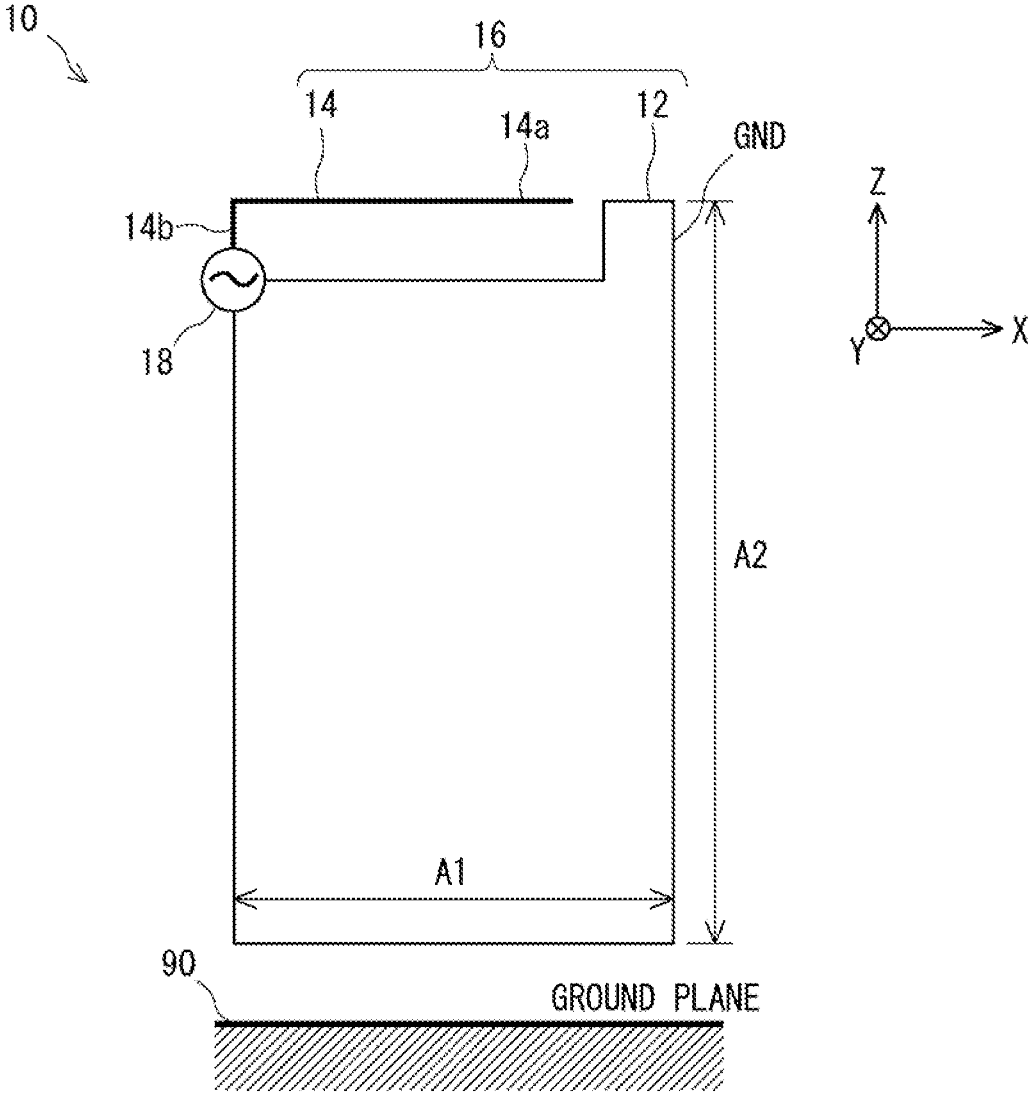
FIG. 5 is a diagram showing a wireless apparatus according to a first comparative example.

FIG. 5 is a diagram showing a wireless apparatus 10 according to a first comparative example. The wireless apparatus 10 according to the first comparative example includes a substrate 12, an antenna element 14 provided on the substrate 12, and a drive unit 18. Furthermore, the substrate 12 and the antenna element 14 form an antenna device 16. The drive unit 18 supplies power to the antenna element 14. The substrate 12 includes a substrate ground (GND).

For example, the antenna element 14 may be an antenna pattern drawn (printed) on the substrate 12. For example, the antenna element 14 is a reverse L-shaped antenna. Accordingly, the antenna element 14 includes a horizontal portion 14*a* that is a component parallel to the ground plane 90, and a perpendicular portion 14*b* that is a component perpendicular to the ground plane 90. The antenna element 14 (the antenna device 16) thus has both horizontal polarization and vertical polarization.

Furthermore, the substrate 12 of the wireless apparatus 10 according to the first comparative example is formed such that a dimension A1 in a direction parallel to the ground plane 90 is smaller than a dimension A2 in a direction perpendicular to the ground plane 90. That is, A1<A2 is true. For example, A1 is 60 mm and A2 is 100 mm, but the dimensions of the substrate 12 are not limited thereto.

Figure 6:
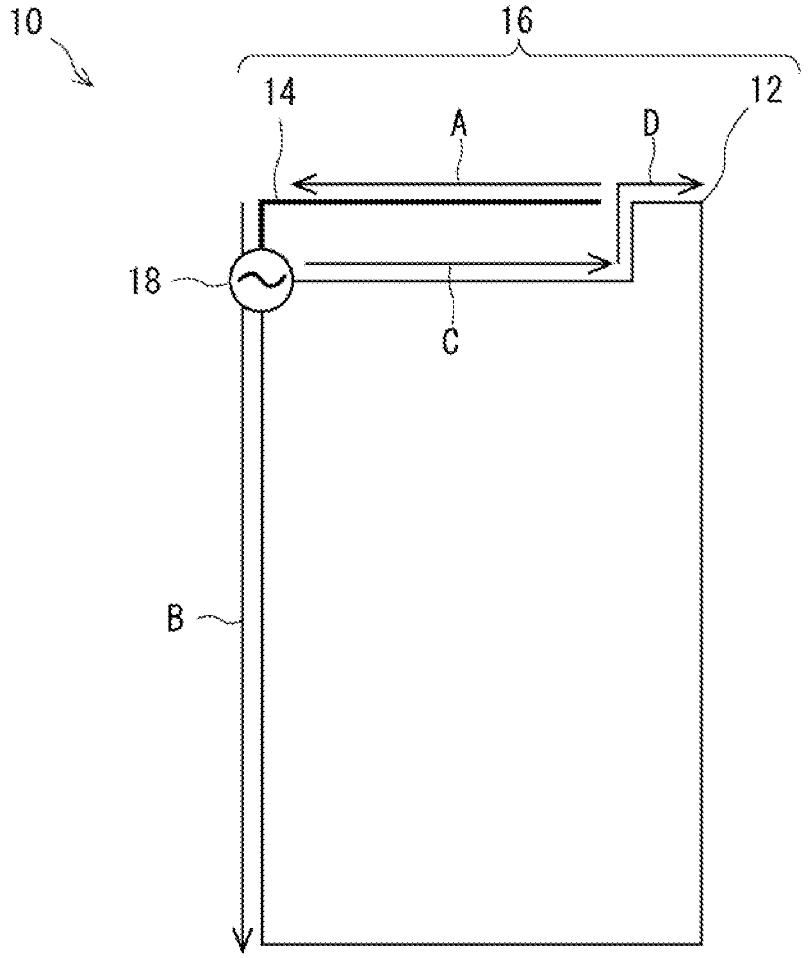
FIG. 6 is a diagram showing an example of a flow of a high-frequency current that flows through the wireless apparatus according to the first comparative example at a certain moment.

FIG. 6 is a diagram showing an example of a flow of a high-frequency current that flows through the wireless apparatus 10 according to the first comparative example at a certain moment. The antenna element 14 is provided on the substrate 12 including the substrate ground (GND), and thus, as indicated by arrows A to D in FIG. 6, a high-frequency current flows through not only the antenna element 14 but also the substrate 12 (GND). Accordingly, the antenna device 16 formed by the substrate 12 and the antenna element 14 functions as an antenna.

Figure 7:
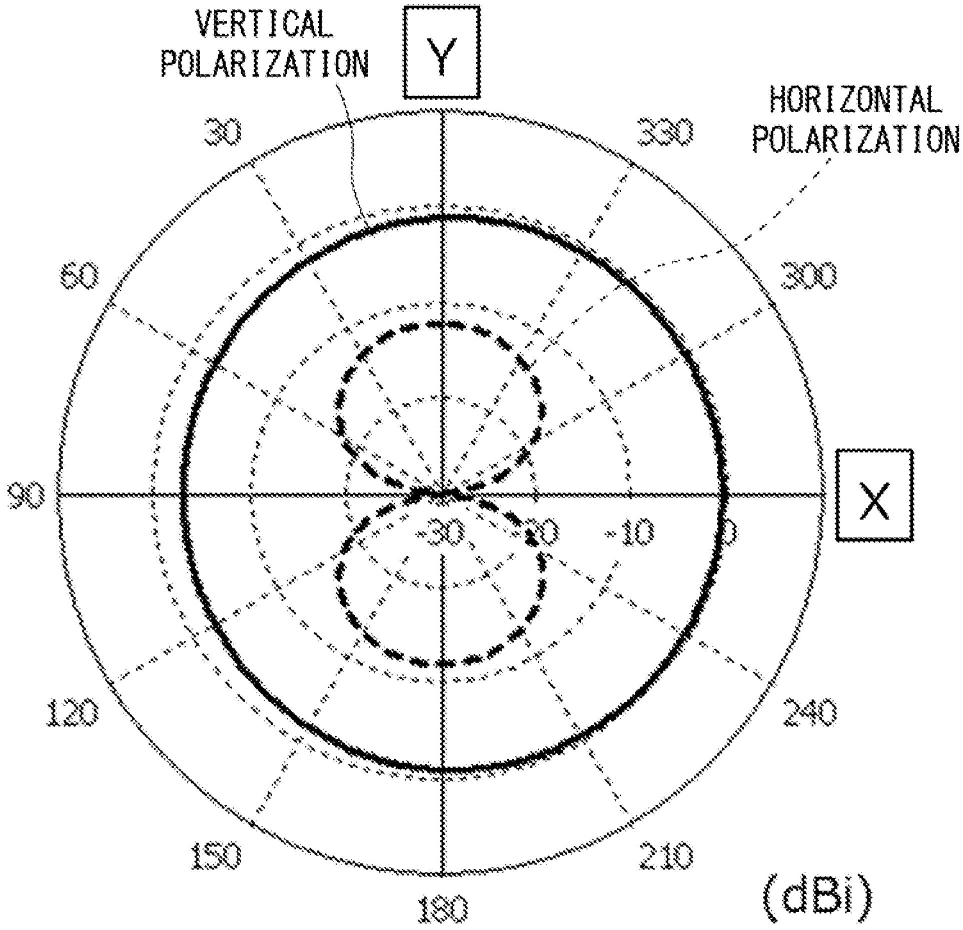
FIG. 7 is a diagram showing an example of a radiation pattern, in a ground plane direction, of the wireless apparatus according to the first comparative example shown in FIG. 5.

FIG. 7 is a diagram showing an example of a radiation pattern, in the ground plane direction (on the XY plane), of the wireless apparatus 10 according to the first comparative example shown in FIG. 5. Here, generation of horizontal polarization and vertical polarization is determined based on distribution of the high-frequency current on the antenna device 16, and is generally dependent on the length of a component, of the entire antenna device 16 functioning as the antenna, that is parallel to the ground plane 90 and the length of a component that is perpendicular to the ground plane 90. With the wireless apparatus 10 according to the first comparative example, the length of the component that is perpendicular to the ground plane 90 is great and the length of the component that is parallel to the ground plane 90 is small, and thus, vertical polarization is great and horizontal polarization is small.

Figure 8:
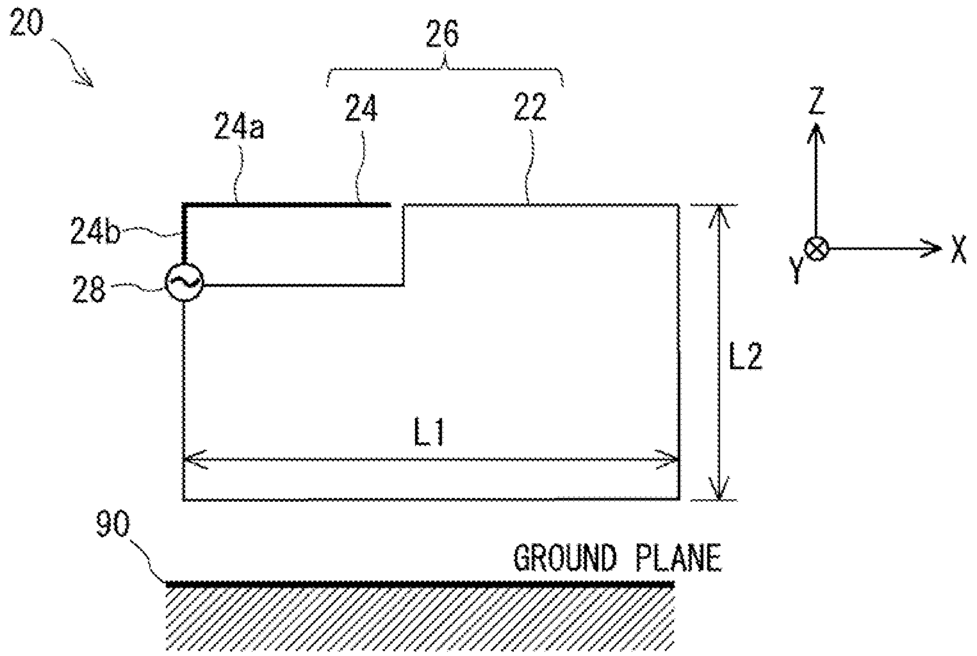
FIG. 8 is a diagram showing a wireless apparatus according to a second comparative example.

FIG. 8 is a diagram showing a wireless apparatus 20 according to a second comparative example. Like the wireless apparatus 10 according to the first comparative example, the wireless apparatus 20 according to the second comparative example includes a substrate 22, an antenna element 24 provided on the substrate 22, and a drive unit 28. Furthermore, the substrate 22 and the antenna element 24 form an antenna device 26. The drive unit 28 supplies power to the antenna element 24. The substrate 22 includes a substrate ground (GND).

Like the antenna element 14, the antenna element 24 may be an antenna pattern drawn (printed) on the substrate 22, for example. The antenna element 24 is a reverse L-shaped antenna, for example. Accordingly, the antenna element 24 includes a horizontal portion 24*a* that is a component parallel to the ground plane 90, and a perpendicular portion 24*b* that is a component perpendicular to the ground plane 90. The antenna element 24 (and the antenna device 26) thus has both horizontal polarization and vertical polarization.

The substrate 22 of the wireless apparatus 20 according to the second comparative example is formed such that the dimensions are switched, in a long direction and a short direction, of the substrate 12 of the wireless apparatus 10 according to the first comparative example. That is, the substrate 22 is formed such that a dimension L1 in the direction parallel to the ground plane 90 is greater than a dimension L2 in the direction perpendicular to the ground plane 90. That is, L1>L2 is true. For example, L1 is 100 mm and L2 is 60 mm, but the dimensions of the substrate 22 are not limited thereto.

Figure 9:
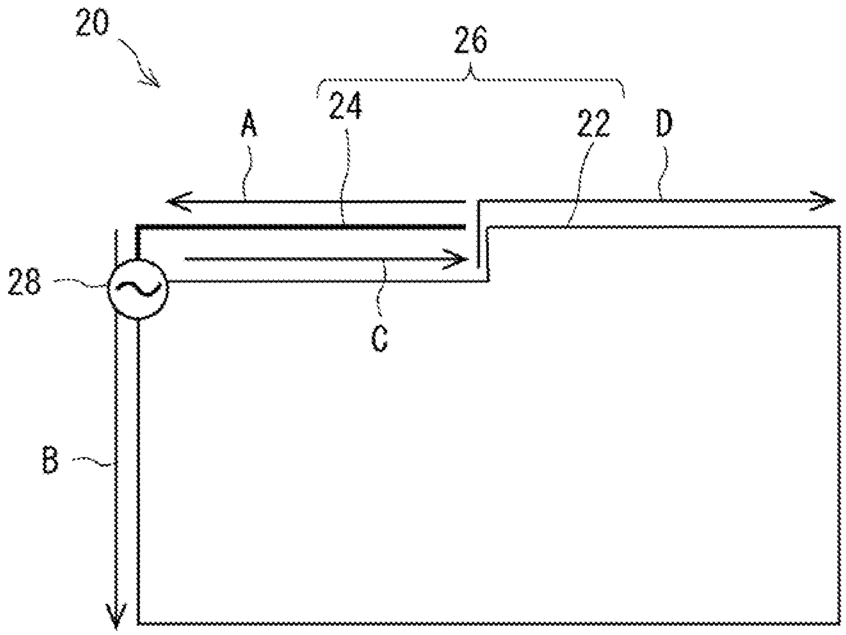
FIG. 9 is a diagram showing an example of a flow of a high-frequency current that flows through the wireless apparatus according to the second comparative example at a certain moment.

FIG. 9 is a diagram showing an example of a flow of a high-frequency current that flows through the wireless apparatus 20 according to the second comparative example at a certain moment. Like the wireless apparatus 10 according to the first comparative example, the antenna element 24 is provided on the substrate 22 including the substrate ground (GND), and thus, as indicated by arrows A to D in FIG. 9, a high-frequency current flows through not only the antenna element 24 but also the substrate 22 (GND). Accordingly, the antenna device 26 formed by the substrate 22 and the antenna element 24 functions as an antenna.

Here, the frequency of the high-frequency current is assumed to be 900 MHz. As indicated by the arrows A and B, the high-frequency current flows through the antenna element 24 and in the short direction (a perpendicular direction) of the substrate 22. Furthermore, as indicated by the arrows C and D, the high-frequency current flows through a part facing the antenna element 24 (in the long direction (a horizontal direction) of the substrate 22).

The direction of the high-frequency current flowing through the antenna element 24 (indicated by the arrow A) is opposite the direction of the high-frequency current flowing in the long direction of the substrate 22 (indicated by the arrows C and D). Accordingly, some horizontally polarized waves caused by the high-frequency current flowing in the horizontal direction cancel each other out, and remaining horizontally polarized waves that are not cancelled are radiated outside.

Furthermore, in a case where the dimension of the substrate 22 in the short direction (the perpendicular direction) is smaller than ¼ of a wavelength of the frequency 900 MHz, it becomes difficult for the high-frequency current to flow in the short direction. This reduces radiation, due to the high-frequency current in the perpendicular direction of the antenna device 26 (the current flowing in the direction indicated by the arrow B), in other words, the vertical polarization (see FIG. 10 described later). This is due to the following reason. That is, as described later, to obtain resonance in an antenna, the length of the antenna needs to be about ½ of the wavelength of the resonance frequency of the antenna (the antenna element 24). In the case where about ¼ of the wavelength of the resonance frequency is secured by the antenna element 24, the length of the remaining ¼ of the wavelength is required of the substrate 22. Accordingly, if the dimension of the substrate 22 in the short direction (the perpendicular direction) is smaller than ¼ of the wavelength, the high-frequency current flows in the long direction where the length of ¼ of the wavelength is secured. Accordingly, it becomes difficult for the high-frequency current to flow in the short direction.

Figure 10:
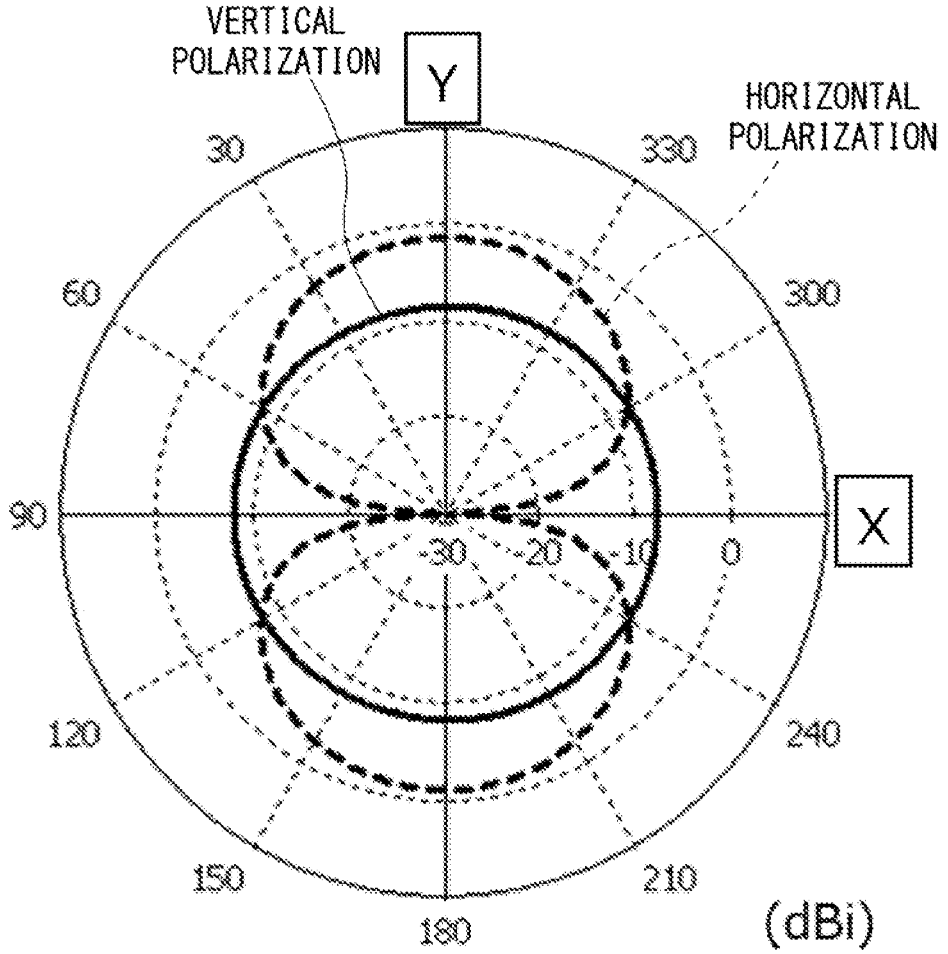
FIG. 10 is a diagram showing an example of a radiation pattern, in a ground plane direction, of the wireless apparatus according to the second comparative example shown in FIG. 8.

FIG. 10 is a diagram showing an example of a radiation pattern, in the ground plane direction (on the XY plane), of the wireless apparatus 20 according to the second comparative example shown in FIG. 8. When compared with the wireless apparatus 10 according to the first comparative example, the wireless apparatus 20 according to the second comparative example has a shorter length in the direction perpendicular to the ground plane 90 (a vertical direction), and thus, the vertical polarization in FIG. 10 is smaller than the vertical polarization in FIG. 5. In contrast, when compared with the wireless apparatus 10 according to the first comparative example, the wireless apparatus 20 according to the second comparative example has a longer length in the direction parallel to the ground plane 90 (the horizontal direction), and thus, the horizontal polarization in FIG. 10 is greater than the horizontal polarization in FIG. 5. In this manner, to obtain great horizontal polarization, the length of the component of the antenna device that is parallel to the ground plane has to be increased, and to obtain great vertical polarization, the length of the component of the antenna device that is perpendicular to the ground plane has to be increased.

To perform transmission/reception of radio waves between wireless apparatuses, polarizations of antennas have to be matched between the wireless apparatuses. At this time, in the case where the antenna of the counterpart apparatus only has vertical polarization, the antenna of the subject wireless apparatus needs to have vertical polarization. As described above, to obtain vertical polarization, the component of the antenna device that is perpendicular to the ground plane has to be increased, and thus, to obtain great vertical polarization, the height of the wireless apparatus may have to be increased. However, the height of the wireless apparatus is often restricted by installation conditions and the like of the wireless apparatus. In such a case, the vertical polarization possibly becomes small, and this may result in a problem of a reduced communication range between the wireless apparatuses.

In contrast, a wireless apparatus according to the present disclosure includes an antenna device configured by a substrate including a substrate ground and an antenna element provided on the substrate, and a conductor formed into a sideways U-shape. The conductor includes an upper section and a lower section that are disposed along a ground plane and vertically relative to each other (i.e., disposed above and below, respectively), and a middle section that is disposed substantially perpendicular to the ground plane, between one end of the upper section and one end of the lower section. The upper section, the lower section, and the middle section of the conductor are disposed near an upper side section, a lower side section, and a lateral side section of the antenna device, respectively. The upper section of the conductor is disposed near the antenna element, and the conductor functions as an antenna due to current being excited in the conductor when power is supplied to the antenna element.

In other words, the wireless apparatus according to the present disclosure includes an antenna device configured by a substrate including a substrate ground and an antenna element provided on the substrate, and a conductor that is formed into a sideways U-shape and that is disposed to partially surround the antenna device. One end portion of the conductor is disposed near the antenna element, and the conductor functions as an antenna due to current being excited in the conductor when power is supplied to the antenna element. Moreover, the conductor is disposed with a center portion of the conductor substantially perpendicular to ground.

According to such a configuration, the wireless apparatus according to the present disclosure may increase the vertical polarization without increasing the height of the apparatus, as described later. Therefore, with the wireless apparatus according to the present disclosure, the communication range may be prevented from being reduced even in a case where the height of the apparatus is restricted.

First Example Embodiment

In the following, an example embodiment will be described with reference to the drawings. The following description and drawings include omissions or are simplified as appropriate for the sake of clear description. Furthermore, same elements are denoted by a same reference sign in the drawings, and redundant description is omitted as necessary.

Figure 11:
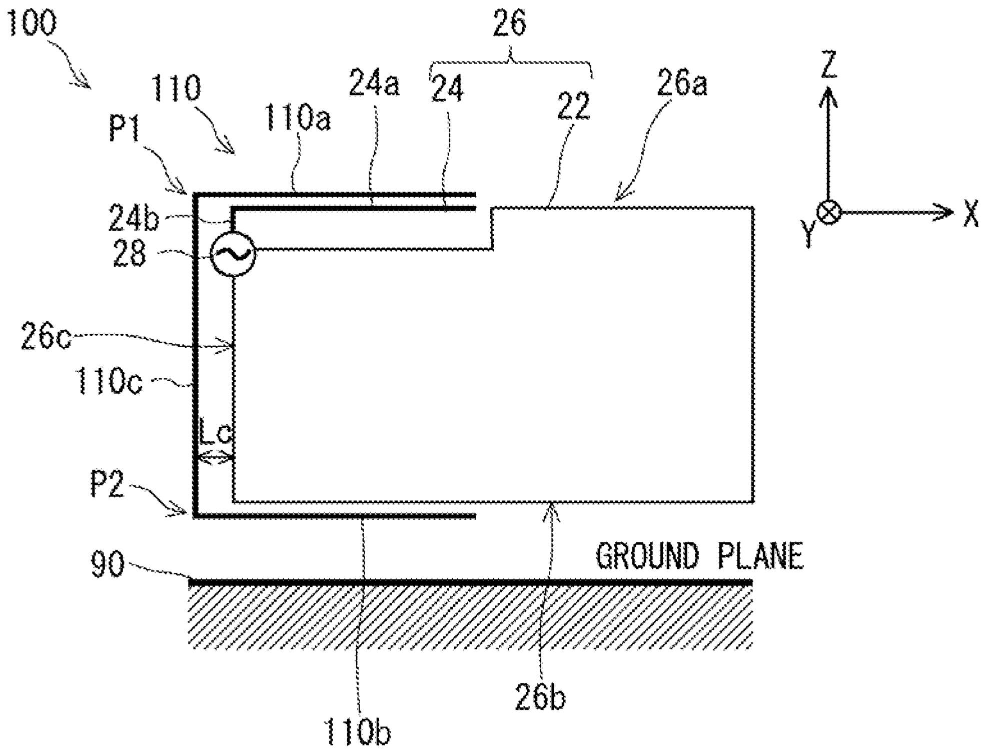
FIG. 11 is a diagram showing a wireless apparatus according to a first example embodiment.
Figure 12:
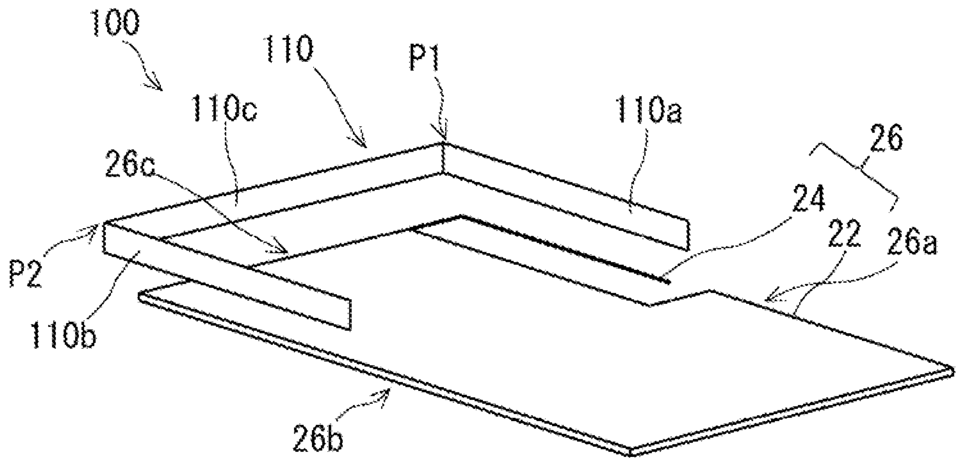
FIG. 12 is a diagram showing the wireless apparatus according to the first example embodiment.

FIGS. 11 and 12 are diagrams showing a wireless apparatus 100 according to a first example embodiment. FIG. 11 is a plan view showing the wireless apparatus 100 from a Y direction, and FIG. 12 is a perspective view of the wireless apparatus 100. Like the wireless apparatus 20 shown in FIG. 8, the wireless apparatus 100 includes a substrate 22, an antenna element 24 provided on the substrate 22, and a drive unit 28. The substrate 22 and the antenna element 24 form an antenna device 26. The substrate 22 includes a substrate ground (GND). Furthermore, like the wireless apparatus 20 shown in FIG. 8, the substrate 22 is formed in such a way that the dimension in the direction perpendicular to the ground plane 90 is smaller than the dimension in the direction parallel to the ground plane 90.

The wireless apparatus 100 according to the first example embodiment further includes a conductor 110 that is formed into a sideways U-shape. The conductor 110 is disposed near the antenna device 26, but is not physically connected to the antenna device 26. Accordingly, the conductor 110 is a parasitic element to which power is not directly supplied by the drive unit 28.

As shown in FIG. 11, the conductor 110 includes an upper section 110*a*, a lower section 110*b*, and a middle section 110*c*. The upper section 110*a* and the lower section 110*b* are disposed along the ground plane 90 and vertically relative to each other. The middle section 110*c* is disposed substantially perpendicular to the ground plane 90, between one end P1 of the upper section 110*a* and one end P2 of the lower section 110*b*. Here, "substantially perpendicular" means that an elevation angle is within a range of 90±45 degrees. Furthermore, in the present specification, the single term "perpendicular" does not mean that the elevation angle is exactly 90 degrees, but may mean that the elevation angle is within the range of 90±45 degrees. Additionally, the upper section 110*a*, the lower section 110*b*, and the middle section 110*c* are integrally formed, and the conductor 110 may be formed by bending a thin long conductor at P1 and P2.

The conductor 110 is disposed such that the upper section 110*a* thereof is along the upper side section 26*a* of the antenna device 26. Furthermore, the conductor 110 is disposed such that the lower section 110*b* thereof is along the lower side section 26*b* of the antenna device 26. Furthermore, the conductor 110 is disposed such that the middle section 110*c* thereof is along the lateral side section 26*c* of the antenna device 26. That is, the conductor 110 is disposed such that the upper section 110*a*, the lower section 110*b*, and the middle section 110*c* thereof are near the upper side section 26*a*, the lower side section 26*b*, and the lateral side section 26*c* of the antenna device 26, respectively. Here, a gap between the middle section 110*c* and the lateral side section 26*c* is given as Lc. Furthermore, the length of the middle section 110*c* is desirably about the same or greater than the length of the lateral side section 26*c*.

The upper section 110*a* of the conductor 110 is disposed near the antenna element 24. A total length of the conductor 110 (a combined length of the upper section 110*a*, the lower section 110*b*, and the middle section 110*c*) is desirably about the same as ½ of the wavelength of the resonance frequency. Resonance may thus be achieved in the conductor 110 at a desired frequency. Moreover, the conductor 110 is desirably disposed in such a way that a center portion of the conductor 110 is substantially perpendicular to the ground plane 90.

The drive unit 28 is disposed near an outer edge (the lateral side section 26*c*) of the substrate 22, and the drive unit 28 supplies power to the antenna element 24. When power is supplied to the antenna element 24 by the drive unit 28, a high-frequency current is excited in the conductor 110 disposed near the antenna element 24. At this time, the conductor 110 resonates at such a frequency that the total length of the conductor 110 is about ½ of the wavelength, and thus functions as an antenna. That is, when a current is excited in the conductor 110 at a time of supply of power to the antenna element 24, the conductor 110 functions as an antenna.

Additionally, in reality, the total length of the conductor 110 has to be shorter than ½ of the wavelength of the actual resonance frequency, when considering an influence of bending of the conductor 110 at P1 and P2, an influence exerted due to the conductor 110 being adjacent to the substrate 22 (GND), and the like. The reason is as follows. In a case where the antenna is expressed as an RLC series equivalent circuit, when the antenna comes close to the ground (GND), the antenna is caused to have electrostatic capacitance, and C (capacitance) is increased. To offset the influence, L (inductance) has to be reduced, and L is adjusted to be small by making the total length shorter than ½ of the wavelength. Accordingly, the total length of the conductor 110 has to be made shorter than ½ of the wavelength of the actual resonance frequency.

Additionally, in the case where a dielectric body such as a housing of the wireless apparatus 100 is present near the conductor 110, the total length of the conductor 110 has to be further reduced. Moreover, intensity of the high-frequency current that is excited in the conductor 110 is dependent on the high-frequency current flowing through the antenna element 24 (the reverse L-shaped antenna). Accordingly, the resonance frequency of the antenna element 24 and the resonance frequency of the conductor 110 have to be matched.

Figure 13:
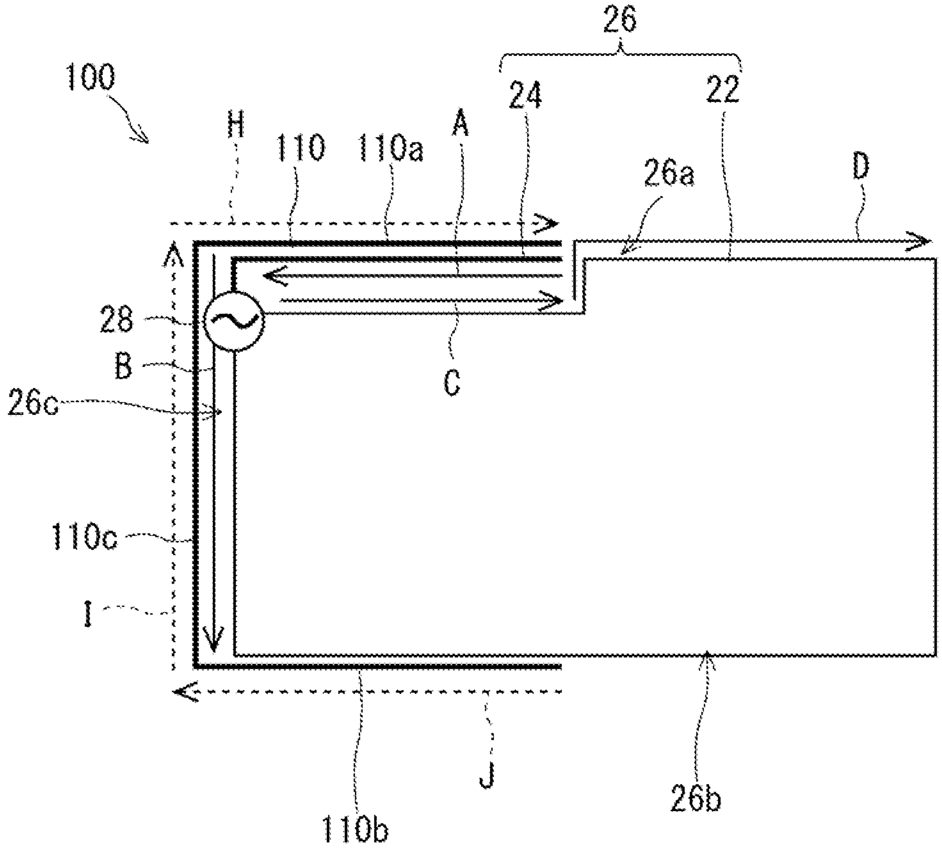
FIG. 13 is a diagram showing an example of a flow of a high-frequency current that flows through the wireless apparatus according to the first example embodiment at a certain moment.

FIG. 13 is a diagram showing an example of a flow of a high-frequency current that flows through the wireless apparatus 100 according to the first example embodiment at a certain moment. The frequency of the high-frequency current is assumed to be 900 MHz. Like the wireless apparatus 20 according to the second comparative example shown in FIG. 9, the high-frequency current flows not only through the antenna element 24 but also the substrate 22, as indicated by arrows A to D in FIG. 13. Accordingly, the antenna device 26 formed by the substrate 22 and the antenna element 24 functions as an antenna.

Furthermore, as shown in FIG. 13, a high-frequency current in an opposite direction from a high-frequency current flowing through the antenna element 24 and in the short direction (the perpendicular direction) of the substrate 22 is excited in the conductor 110. Accordingly, a high-frequency current flows through the upper section 110*a* of the conductor 110 in a direction indicated by a dashed-line arrow H, and a high-frequency current flows through the middle section 110*c* of the conductor 110 in a direction indicated by a dashed-line arrow I, and a high-frequency current flows through the lower section 110*b* of the conductor 110 in a direction indicated by a dashed-line arrow J.

Here, with respect to the high-frequency current excited in the conductor 110, the direction of the high-frequency current flowing through the upper section 110*a* (indicated by the arrow H) and the direction of the high-frequency current flowing through the lower section 110*b* (indicated by the arrow J) are opposite each other. Accordingly, polarizations of the high-frequency currents flowing through the two cancel each other. Accordingly, the upper section 110*a* and the lower section 110*b* hardly contribute to polarized (horizontally polarized) radiation.

A high-frequency current in a direction (indicated by the arrow I) opposite the direction (indicated by the arrow B) of the high-frequency current flowing in the short direction (the perpendicular direction) of the substrate 22 flows through the middle section 110*c*. As described above, the high-frequency current flowing through the short direction (the perpendicular direction) of the substrate 22 is weak. Accordingly, polarization of the high-frequency current flowing through the middle section 110*c* contributes to polarized (vertically polarized) radiation without being much canceled. Now, the high-frequency current that is excited in the conductor 110 whose total length is about ½ of the wavelength of the desired frequency is greatly distributed at the center portion of the conductor 110 and is not much distributed near tip ends. In the present example embodiment, the shape of the conductor 110 is a sideways U-shape, and thus, the center portion of the conductor 110 may be easily disposed to be substantially perpendicular to the ground plane 90. The vertical polarization may thus be increased.

As described above, to increase the vertical polarization, it is important that the high-frequency current is strongly excited in the sideways U-shaped conductor 110. For this purpose, electrical coupling to the antenna element 24 has to be strengthened, and thus, the upper section 110*a* of the conductor 110 has to be disposed near the antenna element 24.

For its part, the middle section 110*c* of the conductor 110 is desirably disposed as far as possible from the lateral side section 26*c* of the substrate 22. That is, the gap Lc between the middle section 110*c* and the lateral side section 26*c* is greater than a length that is determined in advance. That is, Lc>Lth is true. Here, Lth is the length that is determined in advance. For example, in the case where the frequency is 900 MHz, the dimension of the substrate 22 in the long direction is 100 mm and the dimension of the substrate 22 in the short direction is 60 mm, Lth is 5 mm. However, Lth is not limited to such a value. Furthermore, Lth may be set as appropriate according to the frequency and the dimensions of the substrate 22.

Additionally, the reason why the middle section 110*c* of the conductor 110 is desirably disposed as far as possible from the lateral side section 26*c* of the substrate 22 is because the high-frequency current that is excited in the substrate 22 by the conductor 110 gets stronger the closer the middle section 110*c* gets to the substrate 22. The direction of the high-frequency current that is excited in the substrate 22 by the conductor 110 is opposite the direction of the high-frequency current flowing through the conductor 110. Accordingly, when the middle section 110*c* is close to the substrate 22 and the high-frequency current that is excited in the substrate 22 by the conductor 110 is strong, vertically polarized radiation is inhibited.

Figure 14:
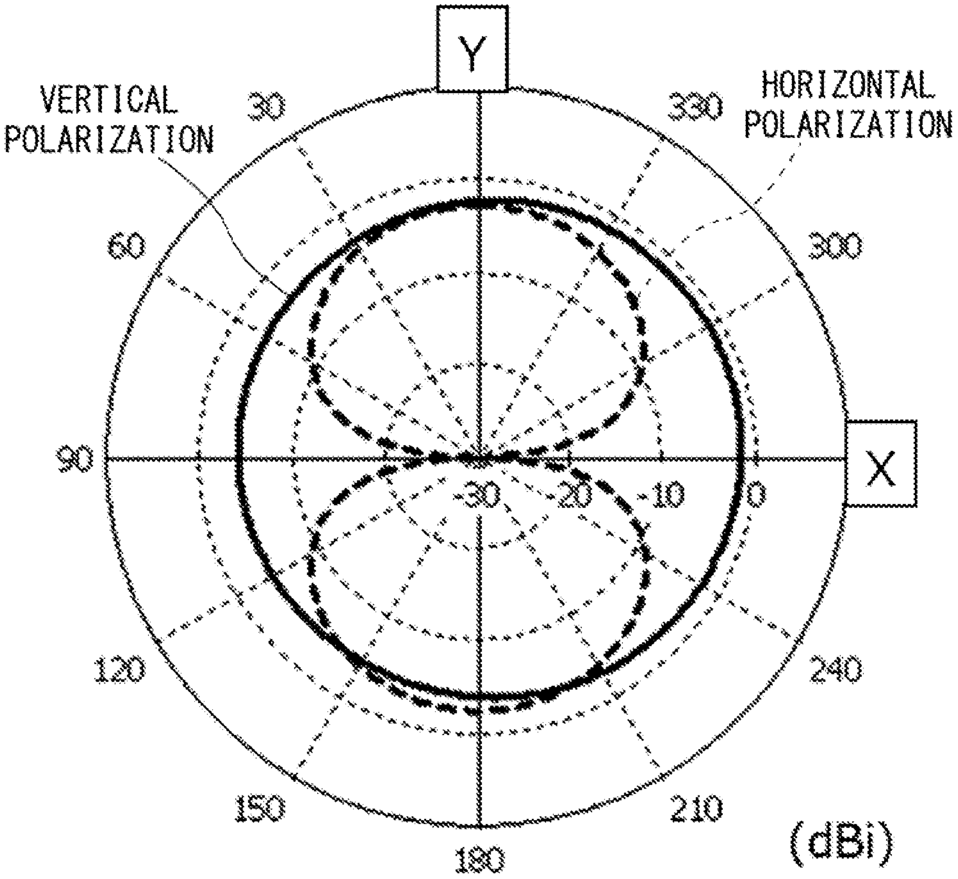
FIG. 14 is a diagram showing an example of a radiation pattern, in a ground plane direction, of the wireless apparatus according to the first example embodiment shown in FIGS. 11 and 12.
Figure 15:
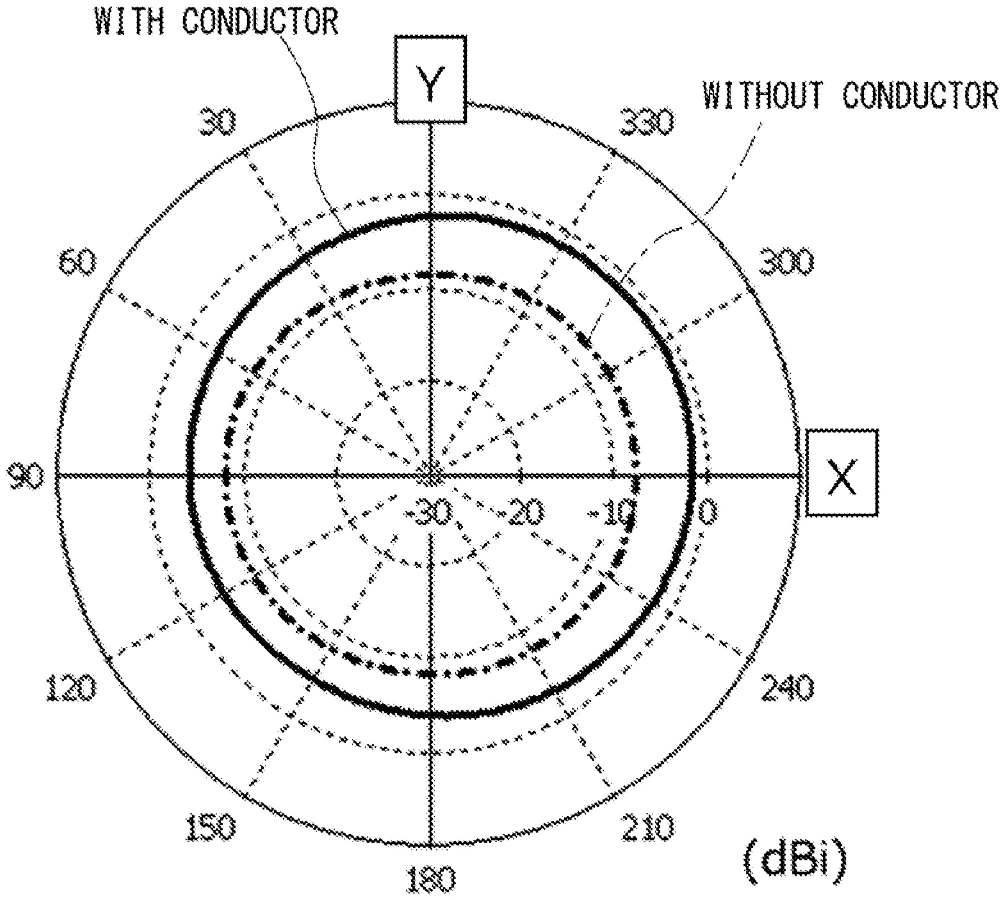
FIG. 15 is a diagram in which a radiation pattern for vertical polarization of the wireless apparatus according to the second comparative example and a radiation pattern for vertical polarization of the wireless apparatus according to the first example embodiment are superimposed on each other.

FIG. 14 is a diagram showing an example of a radiation pattern, in the ground plane direction (on the XY plane), of the wireless apparatus 100 according to the first example embodiment shown in FIGS. 11 and 12. Furthermore, FIG. 15 is a diagram in which a radiation pattern for vertical polarization of the wireless apparatus 20 according to the second comparative example and a radiation pattern for vertical polarization of the wireless apparatus 100 according to the first example embodiment are superimposed on each other. In FIG. 15, the radiation pattern for vertical polarization of the wireless apparatus 20 according to the second comparative example (that is, the radiation pattern for vertical polarization in FIG. 10) is indicated by a thick dash-dotted line, and the radiation pattern for vertical polarization of the wireless apparatus 100 according to the first example embodiment is indicated by a thick solid line.

When comparing FIGS. 10 and 14, the radiation patterns for horizontal polarization in the two are approximately the same. However, a circle of the radiation pattern for vertical polarization in FIG. 14 is larger than a circle of the radiation pattern for vertical polarization in FIG. 10. This is also clear from FIG. 15. That is, the vertical polarization of the wireless apparatus 100 according to the first example embodiment is greater than the vertical polarization of the wireless apparatus 20 according to the second comparative example. Accordingly, with the wireless apparatus 100 according to the first example embodiment, vertically polarized radiation may be increased while preventing the height of the apparatus from being increased.

Additionally, as described above, to increase the vertical polarization of the conductor 110 that is formed into a sideways U-shape, a magnitude of the high-frequency current flowing through the middle section 110*c* of the conductor 110 has to be greater than a magnitude of the high-frequency current flowing in the perpendicular direction of the substrate 22. Furthermore, as described above, when the dimension of the substrate 22 in the perpendicular direction is reduced, distribution of components of the high-frequency current in the perpendicular direction becomes small. According to a result of a simulation, the effect of the wireless apparatus 100 according to the present disclosure is desirably obtained by making the dimension of the substrate 22 in the perpendicular direction equal to or smaller than ⅓ of the wavelength of the resonance frequency of the antenna (the antenna element 24). That is, when the dimension of the substrate 22 in the perpendicular direction is made equal to or smaller than ⅓ of the wavelength of the resonance frequency, the high-frequency current flowing through the substrate 22 in the perpendicular direction may be reduced to an extent that polarization of the high-frequency current flowing through the middle section 110*c* is not greatly canceled.

Second Example Embodiment

Next, a description will be given of a second example embodiment. The following description and drawings include omissions or are simplified as appropriate for the sake of clear description. Furthermore, same elements are denoted by a same reference sign in the drawings, and redundant description is omitted as necessary.

Figure 16:
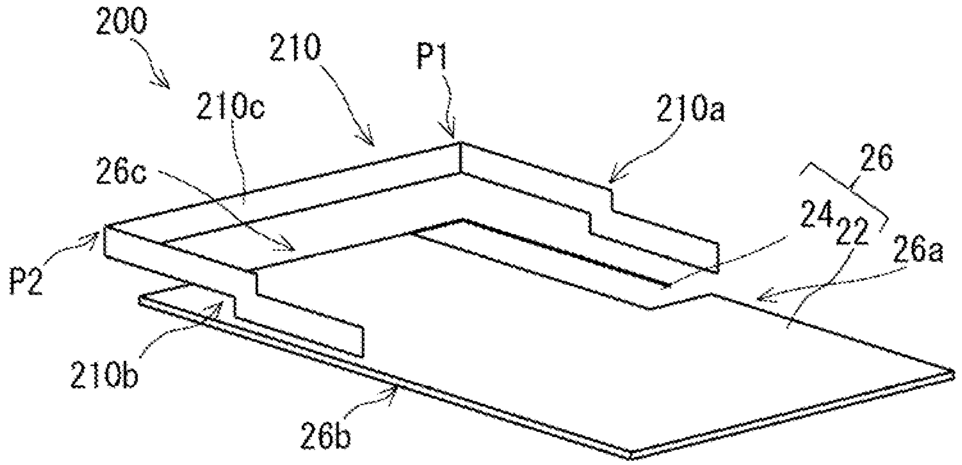
FIG. 16 is a diagram showing a wireless apparatus according to a second example embodiment.

FIG. 16 is a diagram showing a wireless apparatus 200 according to the second example embodiment. FIG. 16 is a perspective view of the wireless apparatus 200. The wireless apparatus 200 includes the antenna device 26 (the antenna element 24 and the substrate 22), and a conductor 210 that is formed into a sideways U-shape. Additionally, although not shown, as in the first example embodiment, the wireless apparatus 200 includes the drive unit 28 for supplying power to the antenna element 24. The antenna device 26 shown in FIG. 16 is substantially the same as the antenna device 26 shown in FIG. 12.

The conductor 210 includes an upper section 210*a*, a lower section 210*b*, and a middle section 210*c*. The middle section 210*c* is substantially the same as the middle section 110*c*. The upper section 210*a* is obtained by changing the shape of the upper section 110*a* such that a tip end portion comes closer to the substrate 22. In the same manner, the lower section 210*b* is obtained by changing the shape of the lower section 110*b* such that a tip end portion comes closer to the substrate 22.

The dimension of the conductor 210 and the positional relationship between the conductor 210 and the substrate 22 are substantially the same as those in the case of the conductor 110 according to the first example embodiment. That is, the length of the conductor 210 is about ½ of the wavelength of the resonance frequency. Furthermore, the upper section 210*a* and the lower section 210*b* are disposed along the ground plane 90 and vertically relative to each other. The middle section 210*c* is disposed substantially perpendicular to the ground plane 90, between one end P1 of the upper section 210*a* and one end P2 of the lower section 210*b*. Furthermore, the conductor 210 is disposed such that the upper section 210*a* thereof is along the upper side section 26*a* of the antenna device 26. The conductor 210 is disposed such that the lower section 210*b* thereof is along the lower side section 26*b* of the antenna device 26. The conductor 210 is disposed such that the middle section 210*c* thereof is along the lateral side section 26*c* of the antenna device 26.

Figure 17:
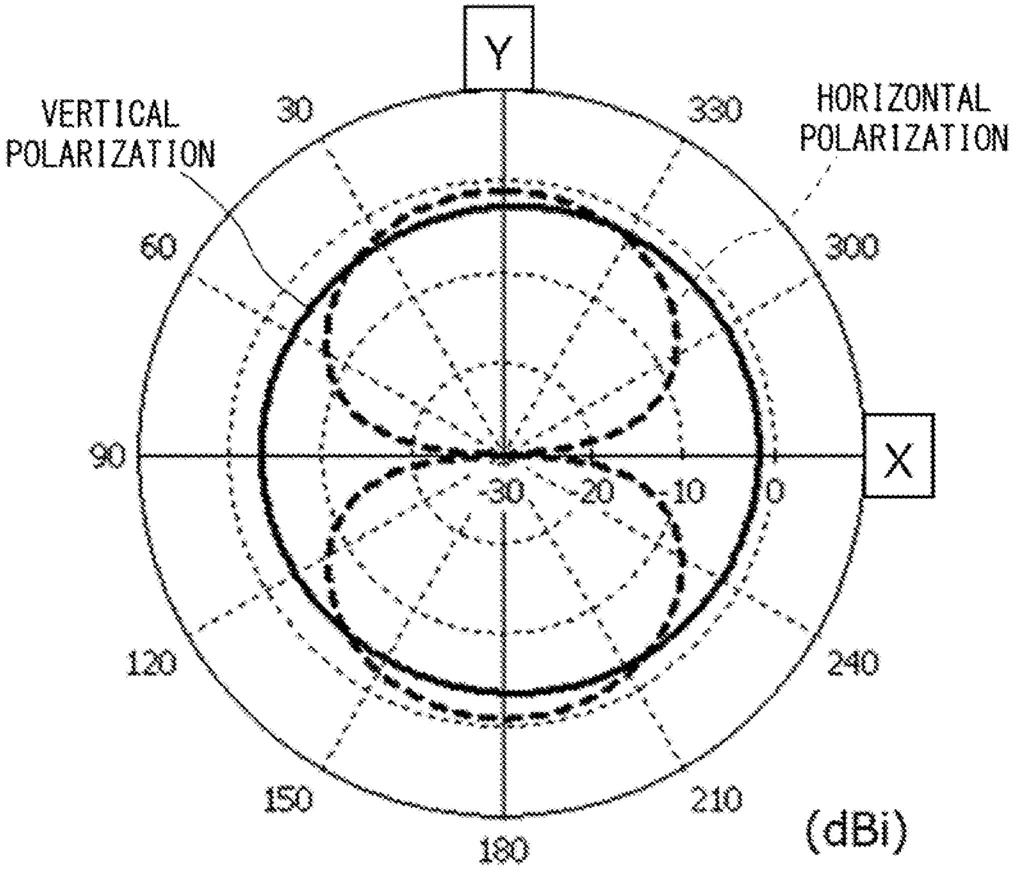
FIG. 17 is a diagram showing an example of a radiation pattern, in a ground plane direction, of the wireless apparatus according to the second example embodiment shown in FIG. 16.
Figure 18:
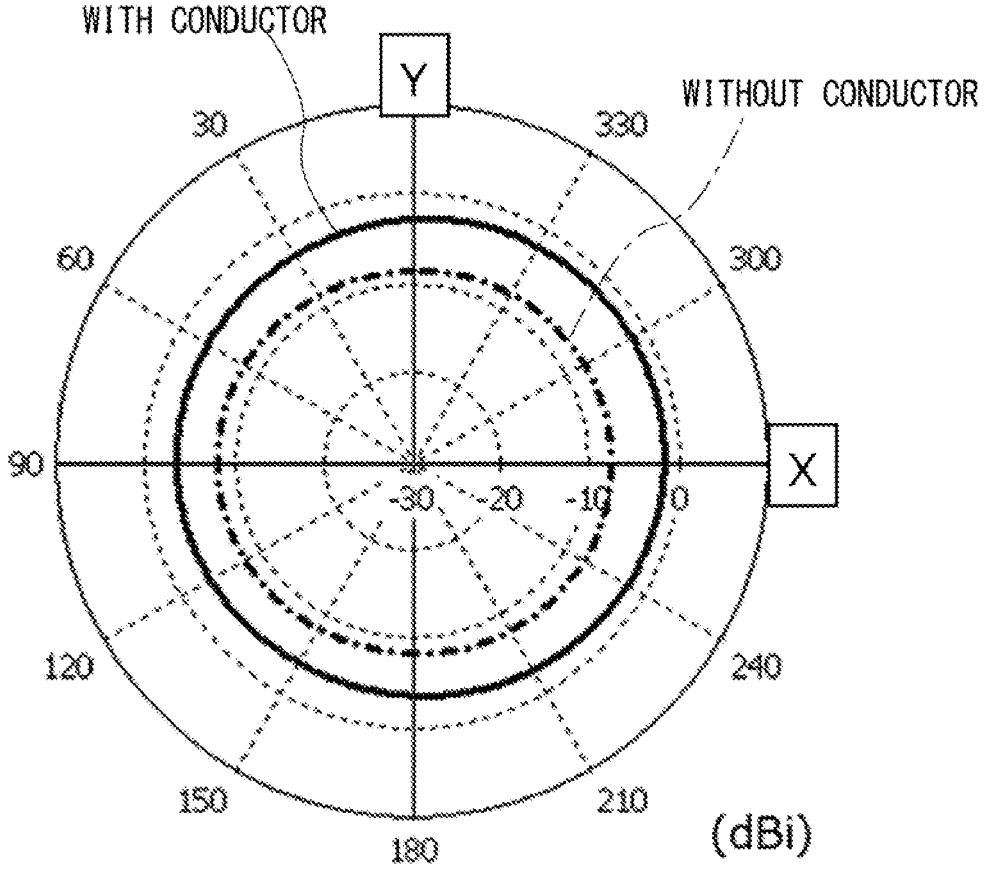
FIG. 18 is a diagram in which a radiation pattern for vertical polarization of the wireless apparatus according to the second comparative example and a radiation pattern for vertical polarization of the wireless apparatus according to the second example embodiment are superimposed on each other.

FIG. 17 is a diagram showing an example of a radiation pattern, in the ground plane direction (on the XY plane), of the wireless apparatus 200 according to the second example embodiment shown in FIG. 16. Furthermore, FIG. 18 is a diagram in which the radiation pattern for vertical polarization of the wireless apparatus 20 according to the second comparative example and a radiation pattern for vertical polarization of the wireless apparatus 200 according to the second example embodiment are superimposed on each other. In FIG. 18, the radiation pattern for vertical polarization of the wireless apparatus 20 according to the second comparative example is indicated by a thick dash-dotted line, and the radiation pattern for vertical polarization of the wireless apparatus 200 according to the second example embodiment is indicated by a thick solid line.

When comparing FIGS. 10 and 17, the radiation patterns for horizontal polarization in the two are approximately the same, as in the first example embodiment. However, a circle of the radiation pattern for vertical polarization in FIG. 17 is larger than the circle of the radiation pattern for vertical polarization in FIG. 10. This is also clear from FIG. 18. That is, the vertical polarization of the wireless apparatus 200 according to the second example embodiment is greater than the vertical polarization of the wireless apparatus 20 according to the second comparative example. Accordingly, also with the wireless apparatus 100 according to the second example embodiment, vertically polarized radiation may be increased while preventing the height of the apparatus from being increased. Accordingly, the conductor to be disposed near the antenna device 26 does not have to be perfectly sideways U-shaped as long as it has a sideways U-shape on the whole.

Third Example Embodiment

Next, a description will be given of a third example embodiment. The following description and drawings include omissions or are simplified as appropriate for the sake of clear description. Furthermore, same elements are denoted by a same reference sign in the drawings, and redundant description is omitted as necessary.

Figure 19:
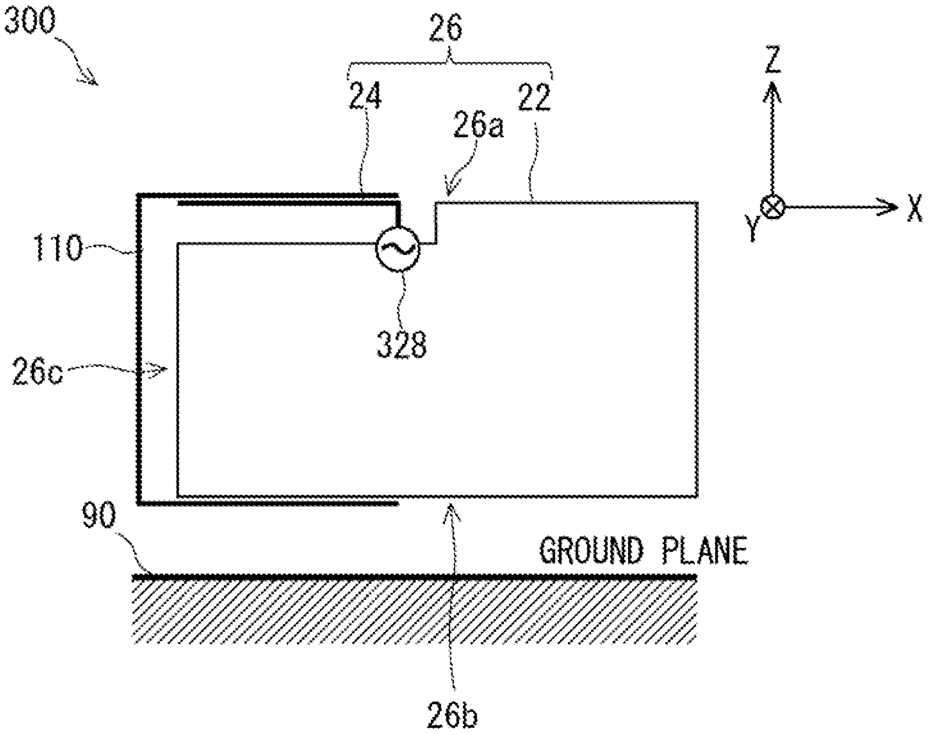
FIG. 19 is a diagram showing a wireless apparatus according to a third example embodiment.

FIG. 19 is a diagram showing a wireless apparatus 300 according to the third example embodiment. FIG. 19 is a plan view showing the wireless apparatus 200 from the Y direction. As shown in FIG. 16, the wireless apparatus 300 includes the antenna device 26 (the antenna element 24 and the substrate 22), a drive unit 328, and the conductor 110 that is formed into a sideways U-shape. Additionally, the conductor 110 may be replaced with the conductor 210.

The drive unit 328 is disposed on an inner side of the substrate 22. The drive unit 328 is disposed on the upper side section 26*a* of the substrate 22. Furthermore, a tip end of the antenna element 24 faces outward of the antenna device 26. That is, in the third example embodiment, a power supply position for the antenna element 24 is different from that in the first example embodiment.

Figure 20:
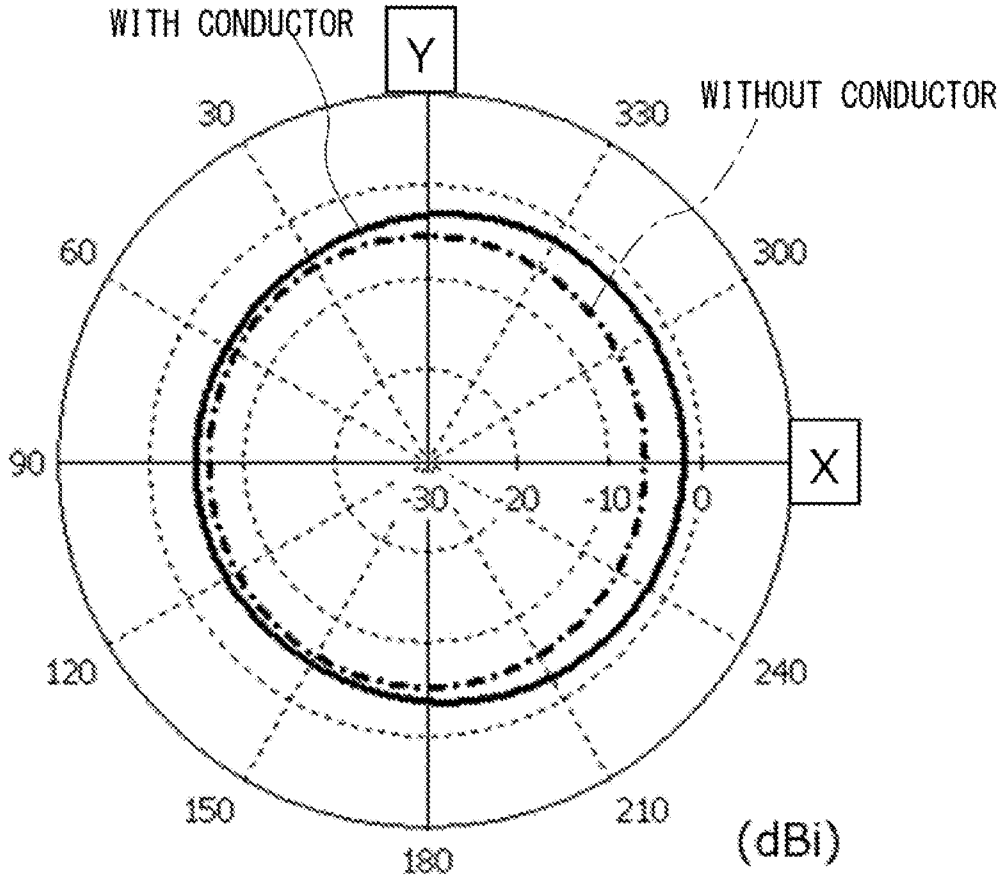
FIG. 20 is a diagram in which a radiation pattern for vertical polarization of the wireless apparatus according to the third example embodiment and a radiation pattern for vertical polarization in a case where a conductor is removed from the wireless apparatus according to the third example embodiment are superimposed on each other.

FIG. 20 is a diagram in which a radiation pattern for vertical polarization of the wireless apparatus 300 according to the third example embodiment and a radiation pattern for vertical polarization in a case where the conductor 110 is removed from the wireless apparatus 300 according to the third example embodiment are superimposed on each other. In FIG. 20, the radiation pattern for vertical polarization in the case where the conductor 110 is not included is indicated by a thick dash-dotted line, and the radiation pattern for vertical polarization of the wireless apparatus 300 according to the third example embodiment is indicated by a thick solid line.

As shown in FIG. 20, a circle of the radiation pattern for vertical polarization of the wireless apparatus 300 according to the third example embodiment, or in other words, in the case where the conductor 110 is included, is larger than a circle of the radiation pattern for vertical polarization in the case where the conductor 110 is not included. That is, the vertical polarization of the wireless apparatus 300 according to the third example embodiment is greater than the vertical polarization in the case where the conductor 110 is not included. Accordingly, also with the wireless apparatus 100 according to the third example embodiment, vertically polarized radiation may be increased while preventing the height of the apparatus from being increased. Accordingly, the antenna element 24 may take any form as long as a high-frequency current is excited in the conductor 110 that is formed into a sideways U-shape.

Fourth Example Embodiment

Next, a description will be given of a fourth example embodiment. The following description and drawings include omissions or are simplified as appropriate for the sake of clear description. Furthermore, same elements are denoted by a same reference sign in the drawings, and redundant description is omitted as necessary.

Figure 21:
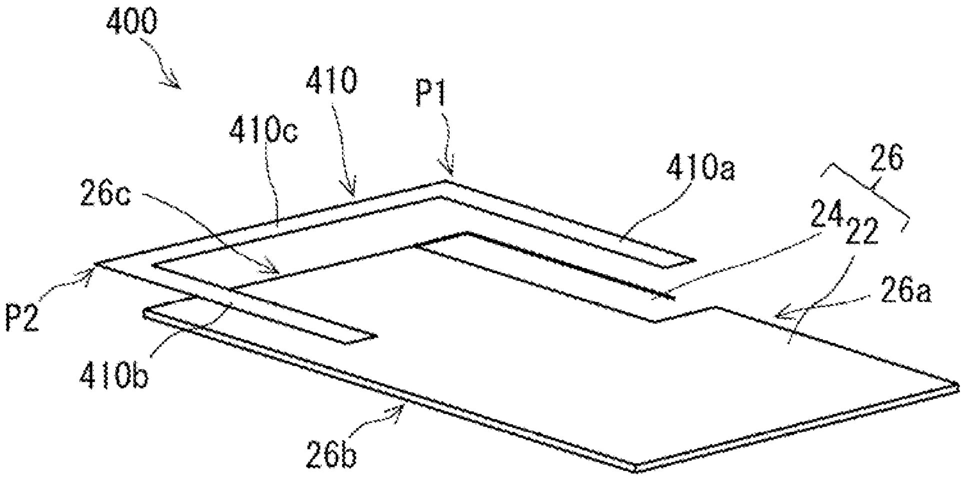
FIG. 21 is a diagram showing a wireless apparatus according to a fourth example embodiment.

FIG. 21 is a diagram showing a wireless apparatus 400 according to the fourth example embodiment. FIG. 21 is a perspective view of the wireless apparatus 400. As shown in FIG. 21, the wireless apparatus 400 includes the antenna device 26 (the antenna element 24 and the substrate 22), and a conductor 410 that is formed into a sideways U-shape. Additionally, although not shown, as in the first example embodiment, the wireless apparatus 400 includes the drive unit 28 for supplying power to the antenna element 24. The antenna device 26 shown in FIG. 21 is substantially the same as the antenna device 26 shown in FIG. 12.

The conductor 410 includes an upper section 410*a*, a lower section 410*b*, and a middle section 410*c*. When seen from the Y direction (an upward direction on the page), the conductor 410 is disposed overlapping the substrate 22 (the antenna device 26).

The positional relationship between the conductor 410 and the substrate 22 in other respects, and the dimension of the conductor 410 are substantially the same as those in the case of the conductor 110 according to the first example embodiment. That is, the length of the conductor 410 is about ½ of the wavelength of the resonance frequency. Furthermore, the upper section 410*a* and the lower section 410*b* are disposed along the ground plane 90 and vertically relative to each other. The middle section 410*c* is disposed substantially perpendicular to the ground plane 90, between one end P1 of the upper section 410*a* and one end P2 of the lower section 410*b*. Furthermore, the conductor 410 is disposed such that the upper section 410*a* thereof is along the upper side section 26*a* of the antenna device 26. The conductor 410 is disposed such that the lower section 410*b* thereof is along the lower side section 26*b* of the antenna device 26. The conductor 410 is disposed such that the middle section 410*c* thereof is along the lateral side section 26*c* of the antenna device 26.

Figure 22:
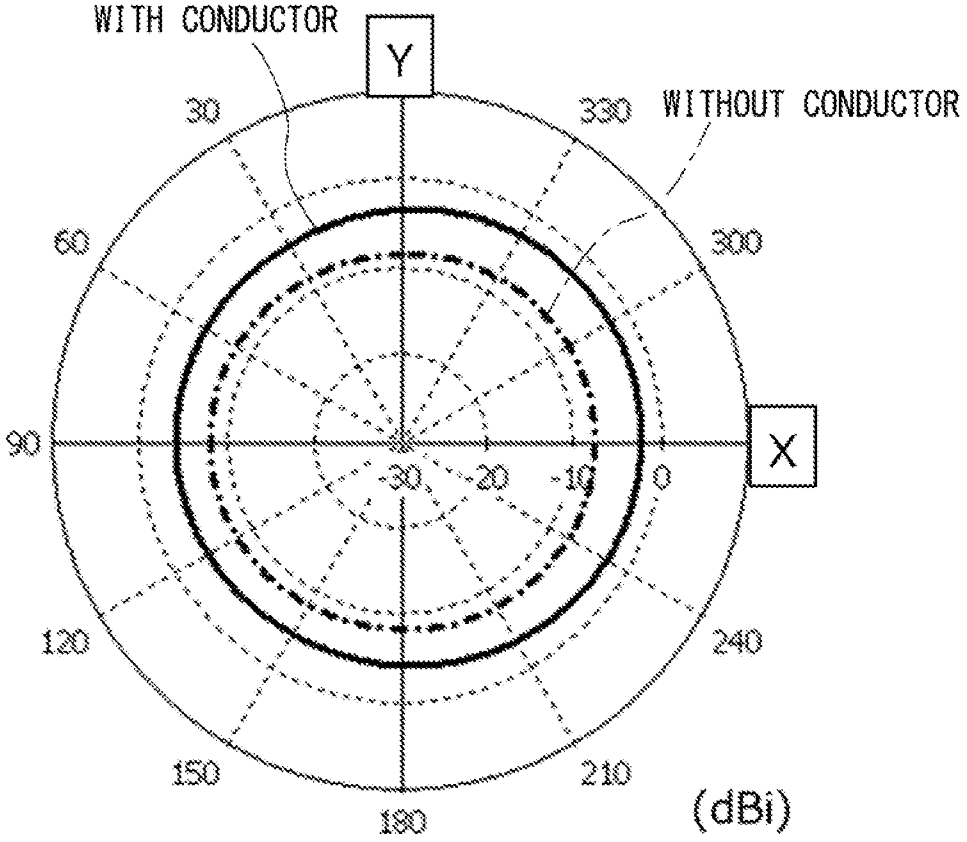
FIG. 22 is a diagram in which a radiation pattern for vertical polarization of the wireless apparatus according to the fourth example embodiment and a radiation pattern for vertical polarization in a case where a conductor is removed from the wireless apparatus according to the fourth example embodiment are superimposed on each other.

FIG. 22 is a diagram in which a radiation pattern for vertical polarization of the wireless apparatus 400 according to the fourth example embodiment and a radiation pattern for vertical polarization in a case where the conductor 410 is removed from the wireless apparatus 400 according to the fourth example embodiment are superimposed on each other. In FIG. 22, the radiation pattern for vertical polarization in the case where the conductor 410 is not included is indicated by a thick dash-dotted line, and the radiation pattern for vertical polarization of the wireless apparatus 400 according to the fourth example embodiment is indicated by a thick solid line. Additionally, the radiation pattern for vertical polarization in the case where the conductor 410 is not included is substantially the same as the radiation pattern for vertical polarization of the wireless apparatus 20 according to the second comparative example.

As shown in FIG. 22, a circle of the radiation pattern for vertical polarization of the wireless apparatus 400 according to the fourth example embodiment, or in other words, in the case where the conductor 410 is included, is larger than a circle of the radiation pattern for vertical polarization in the case where the conductor 410 is not included. That is, the vertical polarization of the wireless apparatus 400 according to the fourth example embodiment is greater than the vertical polarization in the case where the conductor 410 is not included. Accordingly, also with the wireless apparatus 400 according to the fourth example embodiment, vertically polarized radiation may be increased while preventing the height of the apparatus from being increased.

Modifications

Additionally, the present invention is not limited to the example embodiments described above, and may be changed as appropriate within the scope not departing from the spirit of the invention. For example, in the example embodiments described above, the antenna element 24 is a reverse L-shaped antenna, but the antenna element 24 is not limited to a reverse L-shaped antenna.

Furthermore, in the example embodiments described above, the total length of the conductor that is formed into a sideways U-shape is assumed to be about ½ of the wavelength of the resonance frequency, but such a configuration is not restrictive. Resonance may be generated in the conductor even when the total length of the conductor that is formed into a sideways U-shape is about (½)×N of the wavelength (where N is an integer of one or more). However, if N is two or more, the size of the conductor is increased.

Furthermore, in the example embodiments described above, the substrate 22 is formed such that the length in the horizontal direction is greater than the length in the perpendicular direction, but such a configuration is not restrictive. On the other hand, not only the vertical polarization but also the horizontal polarization may be increased by forming the substrate 22 in such a way that the length in the horizontal direction is greater than the length in the perpendicular direction.

Heretofore, the invention of the present application has been described with reference to the example embodiments, but the invention of the present application is not limited to the example embodiments described above. Various modifications that can be understood by those skilled in the art may be made within the scope of the invention in relation to configuration and details of the invention of the present application.

This application claims the benefit of priority to Japanese Patent Application No. 2019-136946 filed on Jul. 25, 2019, which is hereby incorporated by reference in its entirety.

REFERENCE SIGNS LIST

22 SUBSTRATE
24 ANTENNA ELEMENT
24*a* HORIZONTAL PORTION
24*b* PERPENDICULAR PORTION
26 ANTENNA DEVICE
26*a* UPPER SIDE SECTION
26*b* LOWER SIDE SECTION
26*c* LATERAL SIDE SECTION
28 DRIVE UNIT
90 GROUND PLANE
100 WIRELESS APPARATUS

110 CONDUCTOR
110*a* UPPER SECTION
110*b* LOWER SECTION
110*c* MIDDLE SECTION
200 WIRELESS APPARATUS
210 CONDUCTOR
210*a* UPPER SECTION
210*b* LOWER SECTION
210*c* MIDDLE SECTION
300 WIRELESS APPARATUS
328 DRIVE UNIT
400 WIRELESS APPARATUS
410 CONDUCTOR
410*a* UPPER SECTION
410*b* LOWER SECTION
410*c* MIDDLE SECTION

What is claimed is:

1. A wireless apparatus comprising:

an antenna device configured by a substrate including a substrate ground and an antenna element provided on the substrate; and a conductor formed into a sideways U-shape, wherein the conductor includes an upper section and a lower section that are disposed along a ground plane and vertically relative to each other, and a middle section that is disposed substantially perpendicular to the ground plane, between one end of the upper section and one end of the lower section, when the wireless apparatus is disposed above the ground plane which is a surface of earth, the conductor is disposed such that the upper section, the lower section, and the middle section thereof are near an upper side section, a lower side section, and a lateral side section of the antenna device, respectively, and the upper section of the conductor is disposed near the antenna element and a long direction of the upper section of the conductor is disposed along a long direction of the antenna element, and the conductor functions as an antenna due to current being excited in the conductor when power is supplied to the antenna element, wherein the conductor is disposed in such a way that a gap between the middle section of the conductor and the lateral side section of the antenna device is greater than the shortest interval between the upper section of the conductor and the antenna element.

2. The wireless apparatus according to claim 1, wherein the conductor is disposed with a center portion of the conductor substantially perpendicular to the ground plane.

3. The wireless apparatus according to claim 1, wherein the substrate is formed in such a way that a dimension of the substrate in a direction perpendicular to the ground plane is smaller than a dimension of the substrate in a direction parallel to the ground plane.

4. The wireless apparatus according to claim 1, wherein a dimension of the substrate in a direction perpendicular to the ground plane is equal to or smaller than ⅓ of a wavelength of a resonance frequency.

* * * * *